(12) United States Patent
Kimura

(10) Patent No.: US 9,396,527 B2
(45) Date of Patent: Jul. 19, 2016

(54) IMAGE PROCESSING DEVICE AND METHOD

(71) Applicant: DENSO CORPORATION, Kariya, Aichi-pref. (JP)

(72) Inventor: Takayuki Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 113 days.

(21) Appl. No.: 14/391,707

(22) PCT Filed: Feb. 12, 2013

(86) PCT No.: PCT/JP2013/053193
§ 371 (c)(1),
(2) Date: Oct. 10, 2014

(87) PCT Pub. No.: WO2013/153848
PCT Pub. Date: Oct. 17, 2013

(65) Prior Publication Data
US 2015/0110397 A1     Apr. 23, 2015

(30) Foreign Application Priority Data

Apr. 13, 2012 (JP) ................................ 2012-092198

(51) Int. Cl.
| | | |
|---|---|---|
| *G06K 9/00* | (2006.01) | |
| *G06K 9/46* | (2006.01) | |
| *G06K 9/66* | (2006.01) | |
| *H04N 1/46* | (2006.01) | |
| *G06T 5/00* | (2006.01) | |
| *H04N 1/407* | (2006.01) | |

(Continued)

(52) U.S. Cl.
CPC ............ *G06T 5/009* (2013.01); *G06K 9/00798* (2013.01); *G06T 5/007* (2013.01); *G06T 5/40* (2013.01); *G06T 7/0081* (2013.01);

(Continued)

(58) Field of Classification Search
None
See application file for complete search history.

(56) References Cited

U.S. PATENT DOCUMENTS 8,599,257 B2 *  12/2013  Takahashi ............. G06T 7/0081
                                                        348/148
2009/0051794 A1 *  2/2009  Ando ...................... G06T 5/009
                                                        348/274

(Continued)

FOREIGN PATENT DOCUMENTS

| | | |
|---|---|---|
| JP | 2010057080 A | 3/2010 |
| JP | 2010278724 A | 12/2010 |
| WO | WO-2006098360 A1 | 9/2006 |

OTHER PUBLICATIONS

International Search Report (in Japanese with English Translation) for PCT/JP2013/053193, mailed Apr. 16, 2013; ISA/JP.

(Continued)

*Primary Examiner* — Randolph I Chu
(74) *Attorney, Agent, or Firm* — Harness, Dickey & Pierce, P.L.C.

(57) ABSTRACT

In image data having a first number of gradations, an image processing device calculates the number of pixels having luminance within a region, for each region obtained by dividing the range of luminance in the image data into a plurality of regions. The image processing device selects a region from the plurality of regions based on the number of pixels having luminance within the region. The image processing device sets the luminance of the pixels having luminance within the selected region to be within a second number of gradations that is less than the first number of gradations, and sets the luminance of pixels having luminance within a region that has not been selected to a minimum value or a maximum value.

8 Claims, 6 Drawing Sheets

(51) Int. Cl.
*G06T 5/40* (2006.01)
*G06T 7/00* (2006.01)
(52) U.S. Cl.
CPC .... *H04N1/4074* (2013.01); *G06T 2207/20148* (2013.01); *G06T 2207/20208* (2013.01); *G06T 2207/30252* (2013.01); *G06T 2207/30256* (2013.01); *G06T 2207/30261* (2013.01)

(56) References Cited

U.S. PATENT DOCUMENTS

2009/0243823 A1* 10/2009 Takahashi .......... H04N 13/0239
 340/435
2010/0102990 A1* 4/2010 Kamioka .................. G01J 1/18
 340/942
2010/0208071 A1* 8/2010 Takahashi ............. G06T 7/0081
 348/148
2010/0303355 A1 12/2010 Ikeda

OTHER PUBLICATIONS

Written Opinion for PCT/JP2013/053193, mailed Apr. 16, 2013; ISA/JP.

International Preliminary Report on Patentability (in Japanese with English Translation) for PCT/JP2013/053193, issued Oct. 14, 2014.

* cited by examiner

IMAGE PROCESSING DEVICE AND METHOD

CROSS REFERENCE TO RELATED APPLICATIONS

This application is a U.S. National Phase Application under 35 U.S.C. 371 of International Application No. PCT/JP2013/053193 filed on Feb. 12, 2013 and published in Japanese as WO 2013/153848 A1 on Oct. 17, 2013. This application is based on and claims the benefit of priority from Japanese Patent Application No. 2012-092198, filed Apr. 13, 2012. The entire disclosures of all of the above applications are incorporated herein by reference.

TECHNICAL FIELD

The present invention relates to an image processing device and method.

BACKGROUND ART

An image recognition apparatus that recognizes white lines, preceding vehicles, oncoming vehicles, and the like using image data obtained by an on-board camera is known. In recent years, the performance of on-board cameras has improved. An on-board camera may output image data exceeding 8 bits. However, to reduce processing load on the image recognition apparatus, image data that exceeds 8 bits may be converted to 8-bit image data and then used for image recognition (refer to, for example, PTL 1).

CITATION LIST

Patent Literature

[PTL 1] WO 2006/098360

SUMMARY OF INVENTION

Technical Problem

However, when image data exceeding 8 bits is simply converted to 8-bit image data, brightness resolution when image recognition is performed decreases. The present invention has been achieved in light of the foregoing point. An object of the present invention is to provide an image processing device and a method in which brightness resolution does not easily decrease even when the number of gradations in an image is reduced.

Solution to Problem

An image processing device of the present invention calculates, by region pixel count calculating means, in image data having a first number of gradations, a number of pixels having luminance within a region, for each region obtained by dividing the range of luminance in the image data into a plurality of regions. In addition, the image processing device of the present invention selects, by region selecting means, a region from the plurality of regions based on the number of pixels having luminance within the region. Furthermore, the image processing device of the present invention sets, by gradation setting means, the luminance of the pixels having luminance within the region selected by the region selecting means to be within a second number of gradations that is less than the first number of gradations, and the luminance of pixels having luminance within a region that has not been selected by the region selecting means to a minimum value or a maximum value.

When generating the image data having the second number of gradations from the image data having the first number of gradations, the image processing device of the present invention sets the gradation of the second number of gradations for the pixels corresponding to the region selected based on the number of pixels for each region, rather than the entire range of luminance in the image data having the first number of gradations. Therefore, brightness resolution is high in the image having the second number of gradations.

DESCRIPTION OF EMBODIMENTS

An embodiment of the present invention will be described.
1. Configuration of an Image Processing Device 1

Figure 1:
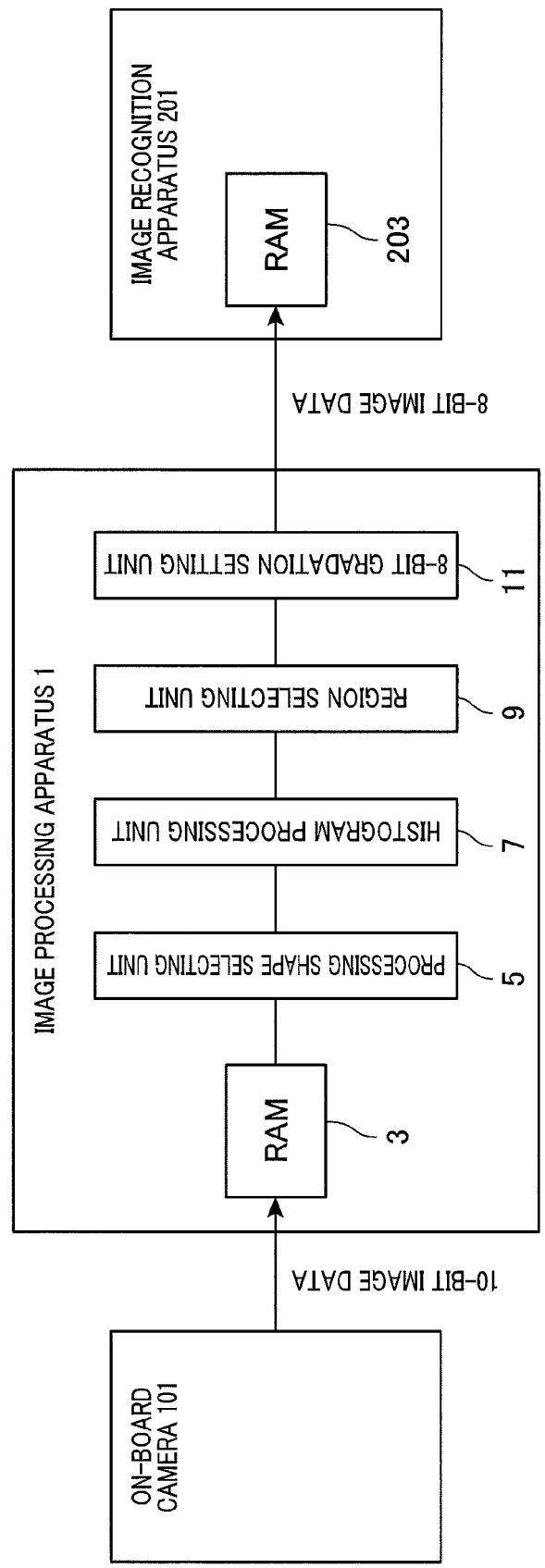
FIG. 1 is a block diagram of a configuration of an image processing device 1.
Figure 2:
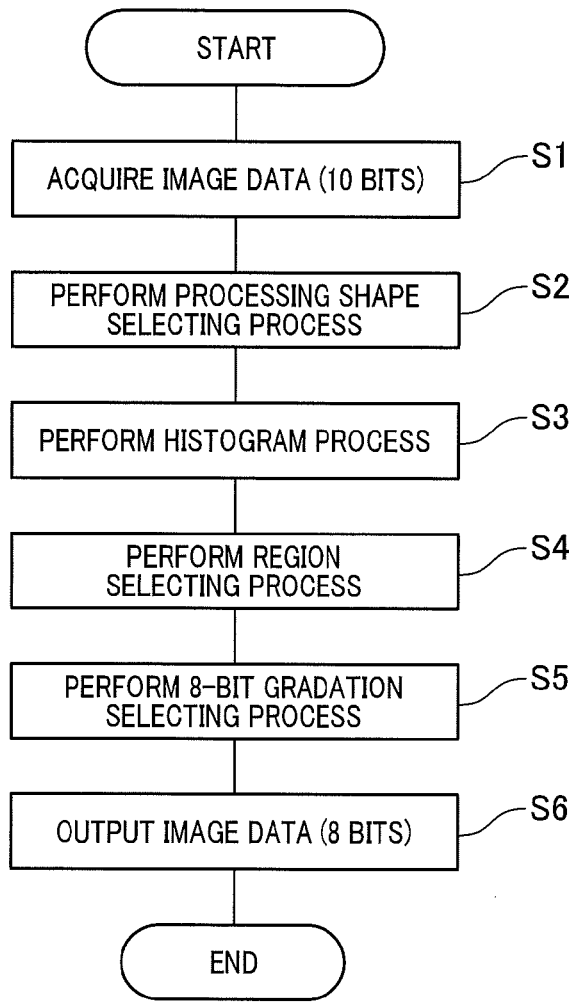
FIG. 2 is a flowchart of processes performed by the image processing device 1.

A configuration of an image processing device 1 will be described with reference to FIG. 1. The image processing device 1 is an on-board apparatus that is mounted in a vehicle. The image processing device 1 receives 10-bit image data capturing the area ahead of the vehicle from an on-board camera 101. The image processing device 1 converts part of the 10-bit image data to 8-bit image data (reduces the number of gradations), and outputs the image data to an image recognition apparatus 201.

The image processing device 1 includes a random access memory (RAM) 3, a processing shape selecting unit 5, a histogram processing unit (region pixel count calculating means) 7, a region selecting unit (region selecting means) 9, and an 8-bit gradation setting unit (gradation setting means) 11. Each configuration of the image processing device 1 is actualized by a known central processing unit (CPU) (computer).

The RAM 3 temporarily stores therein the 10-bit image data received from the on-board camera 101 and outputs the 10-bit image data to the processing shape selecting unit 5. The processing shape selecting unit 5, the histogram processing unit 7, the region selecting unit 9, and the 8-bit gradation setting unit 11 respectively perform a processing shape selecting process, a histogram process, a region selecting process, and an 8-bit gradation setting process, described hereafter. The 8-bit image data is thereby generated. The 8-bit gradation setting unit 11 outputs the generated 8-bit image data to the image recognition apparatus 201.

The image recognition apparatus 201 temporarily stores the 8-bit image data in a RAM 203 and performs an image recognition process using the 8-bit image data. In the image recognition process, white lines ahead of the vehicle, the tail lamps of a preceding vehicle, the headlamps of an oncoming vehicle, and the like are recognized by a known image recognition technique. The recognition results are used in a forward monitoring system, such as for lane departure warning, lane keeping assist, forward collision warning, pre-crash safety, auto emergency brake, and auto high beam.

2. Processes Performed by the Image Processing Device 1

Processes performed by the image processing device 1 will be described with reference to FIG. 2 to FIG. 10. At step S1 in FIG. 2, the image processing device 1 receives the 10-bit image data from the on-board camera 101 and stores the 10-bit image data in the RAM 3. Each pixel in the 10-bit image data has a number of gradations related to luminance that corresponds to 10 bits, or in other words, $2^{10}$ gradations (first number of gradations).

Figure 3:
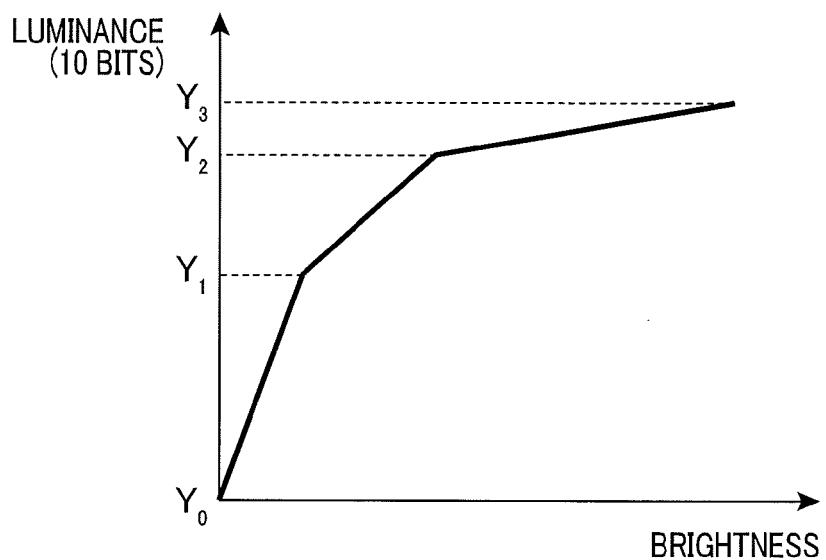
FIG. 3 is a graph showing a relationship between the brightness of light incident on an on-board camera 101 and the luminance of pixels composing image data, regarding 10-bit image data.

As shown in FIG. 3, the image data is dynamic-range image data in which the proportion (slope of the graph in FIG. 3) of the amount of change in luminance of the pixels composing the image data (vertical axis in FIG. 3) in relation to the amount of change in brightness of light incident on the on-board camera 101 (horizontal axis in FIG. 3) differs for each range of luminance. In other words, the above-described slope is greatest when luminance is in the range of $Y_0$ (minimum value) to $Y_1$, intermediate when luminance is in the range of $Y_1$ to $Y_2$, and least when luminance is in the range of $Y_2$ to $Y_3$ (maximum value). $Y_0$, $Y_1$, $Y_2$, and $Y_3$ are each luminance (gradation) expressed by power of two.

Figure 4:
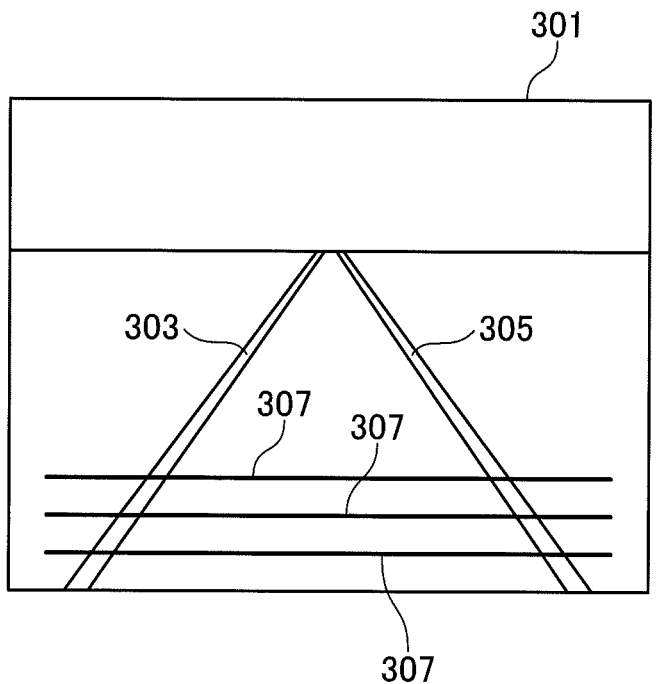
FIG. 4 is an explanatory diagram of lines 307 in 10-bit image data 301.
Figure 5:
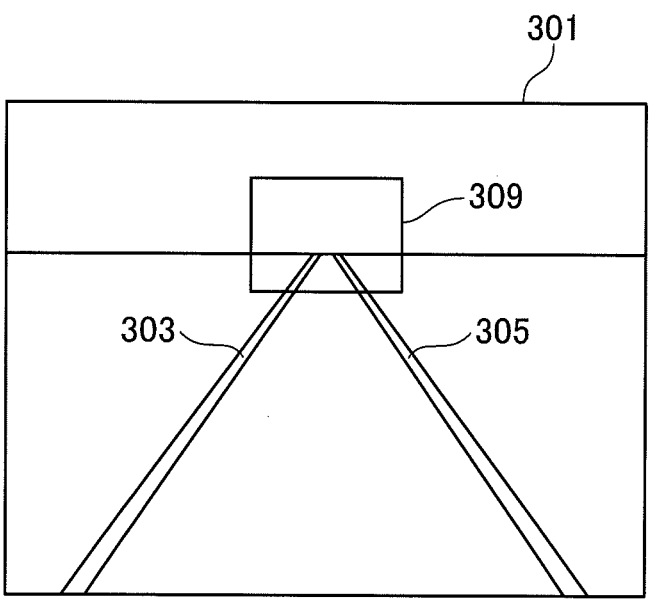
FIG. 5 is an explanatory diagram of an area 309 in the 10-bit image data 301.

At step S2, the processing shape selecting unit 5 selects a portion within the 10-bit image data to be processed (hereinafter referred to as a "processing portion"). As shown in FIG. 4, the processing portion may be one of lines 307 that cut across white lines 303 and 305 along the horizontal direction, in 10-bit image data 301. Alternatively, as shown in FIG. 5, the processing portion may be a rectangular area (an area in which a preceding vehicle or an oncoming vehicle may be present) 309 ahead of the vehicle, in the 10-bit image data 301.

Figure 6:
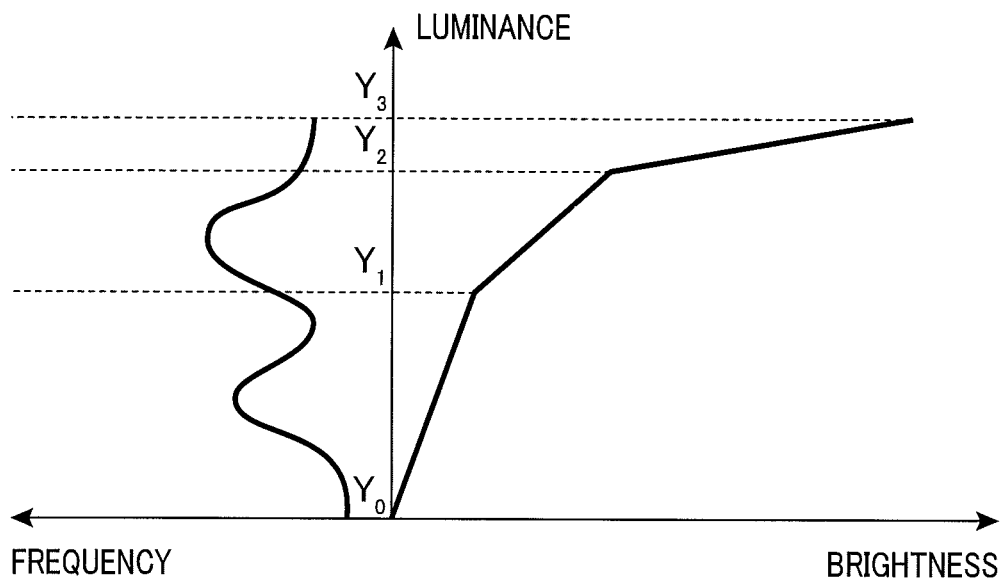
FIG. 6 is a histogram showing the number of pixels (frequency) having each gradation of luminance.

At step S3, the histogram processing unit 7 first acquires the luminance of each pixel present in the processing portion selected at above-described step S2. Next, the histogram processing unit 7 determines the number of pixels having the luminance $Y_0$, the number of pixels having luminance that is a step higher than $Y_0$, the number of pixels having luminance that is two steps higher than $Y_0$, . . . and the number of pixels having the luminance $Y_3$, in the processing portion. As a result, a histogram showing the number of pixels (frequency) having each gradation of luminance, shown in FIG. 6, is obtained.

On the other hand, the histogram processing unit 7 divides the range of luminance ($Y_0$ to $Y_3$) in the 10-bit image data into a region $R_{01}$ from $Y_0$ to $Y_1$, a region $R_{12}$ from $Y_1$ to $Y_2$, and a region$_{23}$ from $Y_2$ to $Y_3$. Then, using the histogram in FIG. 6 obtained as described above, the histogram processing unit 7 calculates a region pixel count $N_{01}$ that is the number of pixels having luminance within the region $R_{01}$ in the processing portion, a region pixel count $N_{12}$ that is the number of pixels having luminance within the region $R_{12}$ in the processing portion, and a region pixel count $N_{23}$ that is the number of pixels having luminance within the region $R_{23}$ in the processing portion.

At step S4, the region selecting unit 9 selects some or all of the regions $R_{01}$, $R_{12}$, and $R_{23}$ based on the region pixel counts $N_{01}$, $N_{12}$, and $N_{23}$ in the following manner. The maximum value among the region pixel counts $N_{01}$, $N_{12}$, and $N_{23}$ is $N_{max}$. The region selecting unit 9 determines whether the value of $N_{max}/N_{all}$ is greater than 0.8 (threshold). Here, $N_{all}$ is the sum of $N_{01}$, $N_{12}$, and $N_{23}$.

When determined that the value of $N_{max}/N_{all}$ is greater than 0.8, the region selecting unit 9 selects the region corresponding to $N_{max}$ (the region $R_{01}$ when $N_{max}$ is the region pixel count $N_{01}$, the region $R_{12}$ when $N_{max}$ is the region pixel count $N_{12}$, or the region $R_{23}$ when $N_{max}$ is the region pixel count $N_{23}$)

Figure 7:
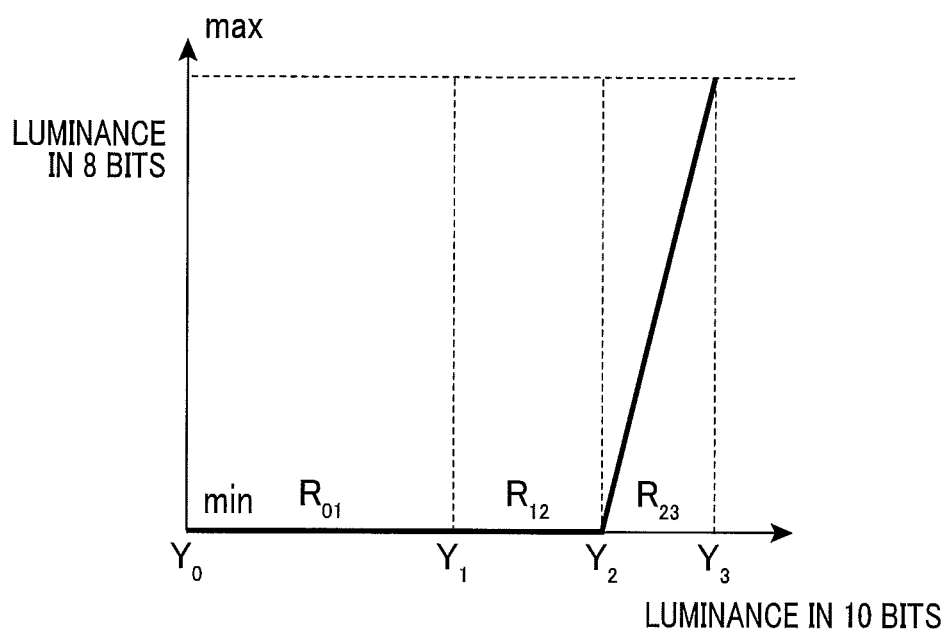
FIG. 7 is an explanatory diagram of a method for setting an 8-bit gradation when region $R_{23}$ is selected.

On the other hand, when determined that the value of $N_{max}/N_{all}$ is 0.8 or less, the the region selecting unit 9 selects all regions $R_{01}$, $R_{12}$, and $R_{23}$. At step S5, the 8-bit gradation setting unit 11 performs an 8-bit gradation setting process on each pixel in the processing portion in the following manner. First, when the region $R_{23}$ is selected at above-described step S4, as shown in FIG. 7, the 8-bit gradation setting unit 11 sets the luminance of the pixels in the processing portion having luminance within the region $R_{23}$ using the entire range of the 8-bit gradation. At this time, in each pixel, there is a linear relationship between the luminance in the 10-bit image data and the newly set 8-bit gradation. On the other hand, the 8-bit gradation setting unit 11 sets the lowest luminance within the 8-bit gradation for the pixels in the processing portion having luminance within the regions $R_{01}$ and $R_{12}$ that have not been selected at above-described step S4.

Figure 8:
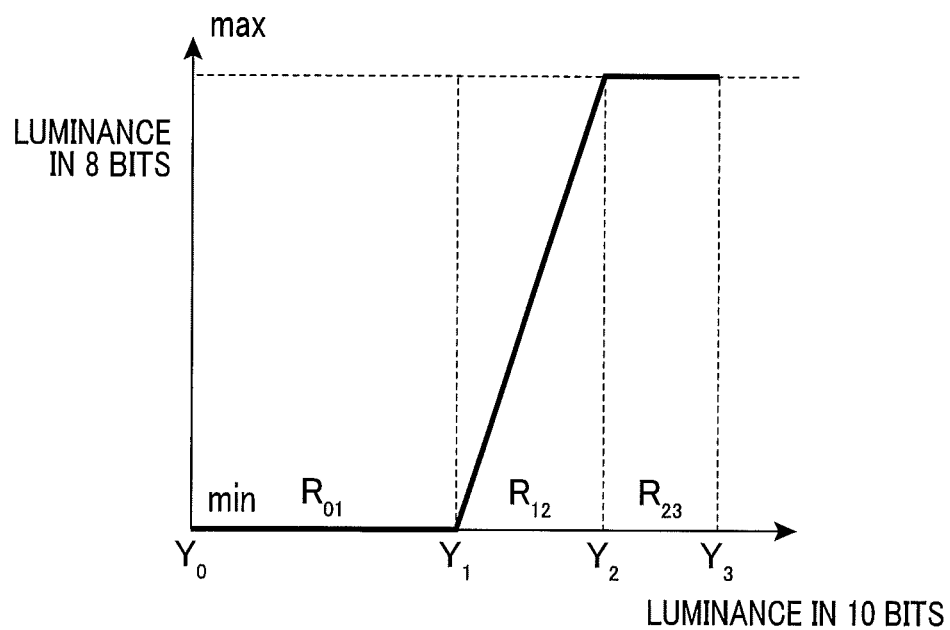
FIG. 8 is an explanatory diagram of a method for setting an 8-bit gradation when region $R_{12}$ is selected.

In addition, when the region $R_{12}$ is selected at above-described step S4, as shown in FIG. 8, the 8-bit gradation setting unit 11 sets the luminance of the pixels in the processing portion having luminance within the region $R_{12}$ using the entire range of the 8-bit gradation. At this time, in each pixel, there is a linear relationship between the luminance in the 10-bit image data and the newly set 8-bit gradation. On the other hand, the 8-bit gradation setting unit 11 sets the lowest luminance within the 8-bit gradation for the pixels in the processing portion having luminance within the region $R_{01}$ that have not been selected at above-described step S4. The 8-bit gradation setting unit 11 sets the highest luminance within the 8-bit gradation for the pixels in the processing portion having luminance within the region $R_{23}$ that have not been selected at above-described step S4.

Figure 9:
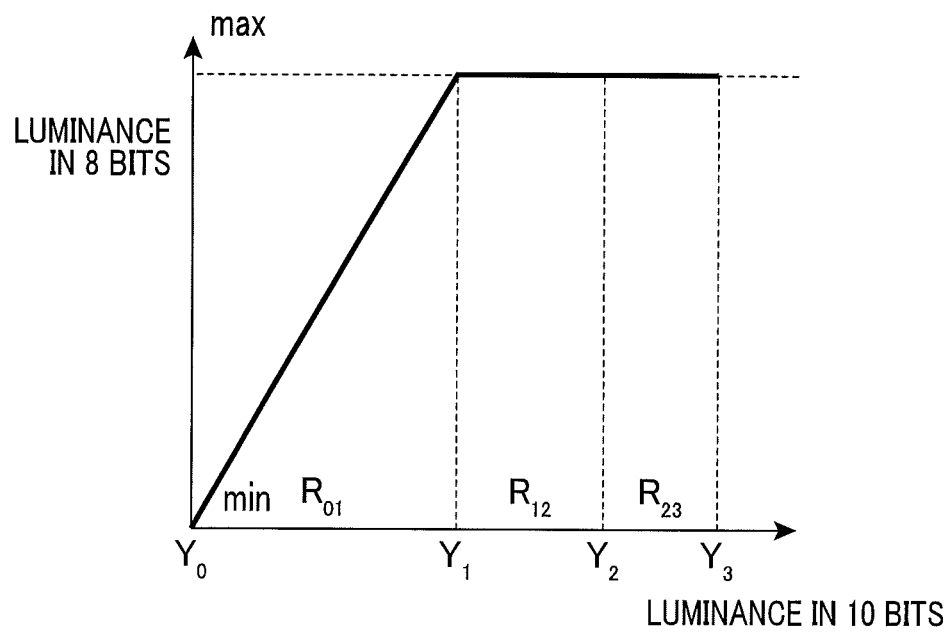
FIG. 9 is an explanatory diagram of a method for setting an 8-bit gradation when region $R_{01}$ is selected.

Furthermore, when the region $R_{01}$ is selected at above-described step S4, as shown in FIG. 9, the 8-bit gradation setting unit 11 sets the luminance of the pixels in the processing portion having luminance within the region $R_{01}$ using the entire range of the 8-bit gradation. At this time, in each pixel, there is a linear relationship between the luminance in the 10-bit image data and the newly set 8-bit gradation. On the other hand, the 8-bit gradation setting unit 11 sets the highest luminance within the 8-bit gradation for the pixels in the processing portion having luminance within the regions $R_{12}$ and $R_{23}$ that have not been selected at above-described step S4.

Figure 10:
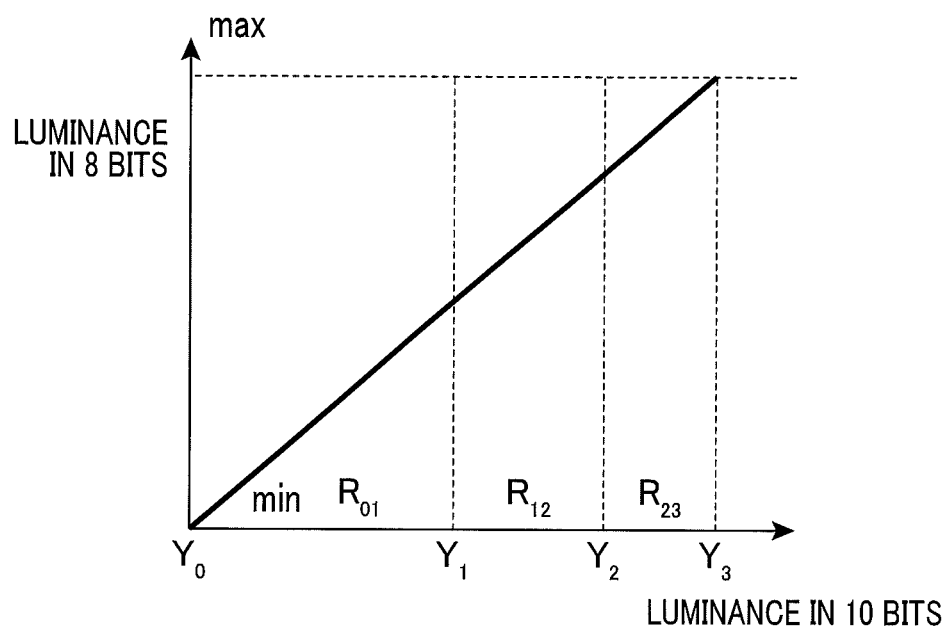
FIG. 10 is an explanatory diagram of a method for setting an 8-bit gradation when all regions are selected.

In addition, when all regions $R_{01}$, $R_{12}$, and $R_{23}$ are selected at above-described step S4, as shown in FIG. 10, the 8-bit gradation setting unit 11 sets the luminance of the pixels having luminance within all regions using the entire range of the 8-bit gradation. In this instance as well, in each pixel, there is a linear relationship between the luminance in the 10-bit image data and the newly set 8-bit gradation.

As described above, the 8-bit image data is generated by luminance in an 8-bit gradation being set for each pixel in the processing portion. The 8-bit image data has $2^8$ gradations (second number of gradations).

At step S6, the 8-bit gradation setting unit 11 outputs the 8-bit image data generated at above-described step S5 to the image recognition apparatus 201.

3. Effects Achieved by the Image Processing Device 1

(1) When generating the 8-bit image data from the 10-bit image data, the image processing device 1 selects a region having a large number of corresponding pixels (a region important in image recognition) rather than selecting the entire range of luminance in the 10-bit image data. The image processing device 1 then sets the 8-bit gradation for the pixels corresponding to the region. Therefore, brightness resolution in the 8-bit image is high.

(2) When there is no region having a significantly higher number of corresponding pixels among the three regions (regions $R_{01}$, $R_{12}$, and $R_{23}$) related to luminance, the image processing device 1 sets the 8-bit gradation for the pixels in all regions. Therefore, even when a region having a significantly higher number of corresponding pixels is not present, the 8-bit image data can be correctly generated.

(3) The image processing device 1 performs processing on the processing portion (the line 307 in FIG. 4 or the area 309 in FIG. 5) that is a portion of the 10-bit image data. Therefore, processing can be performed quickly.

(4) The 10-bit image data and the 8-bit image data generated by the image processing device 1 based on the 10-bit image data are both dynamic-range image data. Therefore, an image supporting a wide range of brightness can be generated.

The present invention is not limited in any way by the above-described embodiment. It goes without saying that various embodiments are possible without departing from the scope of the present invention. For example, the image data inputted to the image processing device 1 may be image data having another number of gradients (such as 12-bit, 14-bit, or 16-bit image data) rather than the 10-bit image data. In addition, the image data inputted to the image processing device 1 may be image data having linear brightness and luminance characteristics, rather than the dynamic-range image data.

In addition, the number of regions into which the range of luminance is divided is not limited to three, and may be a plurality of regions other than three (such as two, four, five, or six). In addition, the method for selecting the region at above-described step S4 may be another method. For example, when the frequency of the pixel count corresponding to continuous regions among the regions R01, R12, and R23 (such as $(N_{01}+N_{12})/N_{all}$ or $(N_{12}+N_{23})/N_{all}$) is greater than a first threshold and the frequency of the pixel count corresponding to one of the two continuous regions is greater than a second threshold, the one region can be selected.

In addition, at above-described step S4, $N_{01}/N_{all}$, $N_{12}/N_{all}$, and $N_{23}/N_{all}$ may be calculated. Each calculation result may be compared to a threshold. All regions of which the result is greater than the threshold may then be selected. In this case, the selected region may be only one. Alternatively, two or three regions may be selected.

In addition, instead of the threshold 0.8 used at above-described step S4, another threshold may be used.

In addition, at above-described step S5, instead of the 8-bit gradation being set, another gradation (such as 6-bit, 4-bit or a number that is the first number of gradations divided by two) may be set.

In addition, at above-described step S5, the luminance of the pixels corresponding to a region that has not been selected may be either the minimum value or the maximum value in the 8-bit gradation.

In addition, the image processing device 1 may perform processing on the overall 10-bit image data.

REFERENCE SIGNS LIST

1: image processing device
3: RAM
5: processing shape selecting unit
7: histogram processing unit
9: region selecting unit
11: 8-bit gradation setting unit
101: on-board camera
201: image recognition apparatus
301: 10-bit image data
303: white line
307: line
309: area

What is claimed is:

1. An image processing device comprising:
region pixel count calculating means for calculating, in image data having a first number of gradations, a number of pixels having luminance within a region, for each region obtained by dividing the range of luminance in the image data into a plurality of regions;
region selecting means for selecting a region from the plurality of regions based on the number of pixels having luminance within the region; and
gradation setting means for setting the luminance of the pixels having luminance within the region selected by the region selecting means to be within a second number of gradations that is less than the first number of gradations, and setting the luminance of pixels having luminance within a region that has not been selected by the region selecting means to a minimum value or a maximum value,
wherein the region selecting means selects a region of which the ratio of the number of pixels having luminance within the region to the number of pixels of all regions is a predetermined threshold or higher.

2. The image processing device according to claim 1, wherein:
the region selecting means selects all regions when a region of which the ratio is the threshold or higher is not present.

3. The image processing device according to claim 1, wherein:
the region pixel count calculating means, the region selecting means, and the gradation setting means perform processing on a portion of the image data having the first number of gradations.

4. The image processing device according to claim 1, wherein:
the image data having the first number of gradations is dynamic-range image data.

5. An image processing method comprising:
a step of calculating, in image data having a first number of gradations, a number of pixels having luminance within a region, for each region obtained by dividing the range of luminance in the image data into a plurality of regions;
a step of selecting a region from the plurality of regions based on the number of pixels having luminance within the region; and
a step of setting the luminance of the pixels having luminance within the region selected by the step of selecting to be within a second number of gradations that is less than the first number of gradations, and setting the luminance of pixels having luminance within a region that has not been selected by the step of selecting to a minimum value or a maximum value, wherein the step of selecting selects a region of which the ratio of the number of pixels having luminance within the region to the number of pixels of all regions is a predetermined threshold or higher.

6. The image processing method according to claim 5, wherein:

the step of selecting selects all regions when a region of which the ratio is the threshold or higher is not present.

7. The image processing method according to claim 5, wherein:

the step of calculating, the step of selecting, and the step of setting perform processing on a portion of the image data having the first number of gradations.

8. The image processing method according to claim 5, wherein:

the image data having the first number of gradations is dynamic-range image data.

* * * * *